United States Patent [19]
Davis et al.

[11] Patent Number: 5,481,098
[45] Date of Patent: Jan. 2, 1996

[54] METHOD AND APPARATUS FOR READING MULTIPLE BAR CODE FORMATS

[75] Inventors: Glen Davis, Junction City; Phillip W. Shepard, Eugene, both of Oreg.

[73] Assignee: Spectra-Physics Scanning Systems, Inc., Eugene, Oreg.

[21] Appl. No.: 149,205

[22] Filed: Nov. 9, 1993

[51] Int. Cl.$^6$ .................................................. G06K 7/10
[52] U.S. Cl. ........................................... 235/462; 235/472
[58] Field of Search ............................... 235/462, 436

[56] References Cited

U.S. PATENT DOCUMENTS

| | | | |
|---|---|---|---|
| 4,354,101 | 10/1982 | Hester et al. | 235/463 |
| 4,463,250 | 7/1984 | McNeight et al. | 235/385 |
| 4,674,513 | 6/1987 | Kuze | 235/375 |
| 4,687,912 | 8/1987 | Ohta | 235/463 |
| 4,782,220 | 11/1988 | Shuren | 235/463 |
| 4,861,972 | 8/1989 | Elliott et al. | 235/462 |
| 4,879,456 | 11/1989 | Cherry et al. | 235/462 |
| 5,144,118 | 9/1992 | Actis et al. | 235/462 |
| 5,329,104 | 7/1994 | Ouchi | 235/462 |

*Primary Examiner*—Donald Hajec
*Assistant Examiner*—Karl D. Frech
*Attorney, Agent, or Firm*—Lyon & Lyon

[57] ABSTRACT

A method and apparatus for increasing the speed of scanners reading multiple bar code symbologies by changing the order of priority in which the various symbologies are tested by the decoder. After a particular symbology has been read a given number of times in a row, its priority is increased. A particular symbology will continue to advance in priority the more often it is read until it becomes the highest priority symbology.

30 Claims, 10 Drawing Sheets

METHOD AND APPARATUS FOR READING MULTIPLE BAR CODE FORMATS

FIELD OF THE INVENTION

The field of the present invention relates to bar code scanners, to label scanning and decoding systems of the type that may be designed to read labels having information which may be presented in any one of a number of different codes commonly in use and, more particularly, to such a scanning system including a method for determining the information encoded as bar code symbols.

BACKGROUND OF THE INVENTION

Labels bearing information in any of a number of different bar code formats are commonly affixed to products, packaging, or other items and are used in many applications. It is common, for example, to encode retail product identification information in a bar code format on a product package or a label affixed to a product package. Bar code symbols are also used on a broad range of retail packages for check-out and inventory purposes. A scanner, located at the check-out station of a retail establishment, may be used by a clerk to enter product identification data into an associated point-of-sale computer system.

Bar codes typically consist of a series of parallel light and dark rectangular areas of varying widths. The light areas are often referred to as "spaces" and the dark areas as "bars". Usually, a minimum element width called a "module" is e defined, with the bars and spaces arranged and selected to define different characters of a particular bar code.

A bar code label is typically read by a scanner which detects reflected and/or refracted light from the bars and spaces comprising the characters. Such a scanner includes a light source for illuminating the bar code label to be read. One common method of illuminating the bar code label is by use of a scanning laser beam, in which case a spot of light is swept across the bar code label and the intensity of returned light is detected by an optical detector. The optical detector generates an electrical signal having an amplitude determined by the intensity of the detected light. Another method for illuminating the bar code label is by use of a uniform light source with an array of optical detectors connected to an analog shift register (commonly called a charge-coupled device or CCD). In such a technique, as with a scanning laser, an electrical signal is generated having an amplitude determined by the intensity of the collected light. In either the laser or CCD technique, the amplitude of the electrical input signal has one level for dark bars and a second level for light spaces. As a label is scanned, positive-going transitions and negative-going transitions in the electrical signal occur, signifying transitions between bars and spaces. The electrical signal is converted to a binary scan signal which is analyzed to determine the arrangement of bars and spaces of the scanned label. The bar and space information is provided to a decoding unit to determine whether the bar code is recognized and, if so, to decode the information contained in the bar code.

While the use of bar codes greatly enhances the efficiency of the check-out process in the retail establishment and additionally allows the accumulation of sales or inventory data which is important for proper management control, difficulties may be encountered due to the number of different bar codes currently in use. Because bar codes in many different formats may need to be read by a scanner at a particular location, the scanner circuitry must be capable of recognizing and decoding labels printed in each of the codes used or expected in a particular application (an ability referred to herein as "autodiscrimination"). This requirement presents substantial difficulties since bar codes in common usage vary significantly in their formats. These codes include, for example, Code 3 of 9, Interleaved 2 of 5 Code, Codabar, Code 93, Code 128, the Universal Product Code (UPC), and the European Article Numbering (EAN) code. Each bar code has its own protocol and requires a separate, unique decoding algorithm. Thus, the amount of time required to perform the decoding algorithms increases as the decoder is required to discriminate among more label types. Further, the scanning speed of the moving laser beam is sufficiently high that the scanner must rapidly analyze the electrical binary scan signal to determine whether a bar code label has been scanned and, if it has, must rapidly analyze the data encoded on the bar code label. Also, it is important that the scanner system be capable of accomplishing these tasks automatically, without intervention by a clerk or other user, even when labels having different bar codes are affixed to products which are scanned.

Performance limitations in present scanners result in the possibility of relatively long decode times and lost decoding opportunities. The decoding unit of a scanner typically comprises, among other things, a processor (e.g., an 8-bit microprocessor) and an area of active memory for running decoding algorithms during the decoding process. The decoding unit has the ability to recognize a particular bar code format if the decoding algorithm for that format is present in the active memory of the decoding unit. Because of limitations in size and processing speed of decoding units, however, particularly in handheld scanners, not all decoding algorithms may be run in active memory at once. Usually, only a single decoding algorithm may be active in the decoding unit at a given time. Because the scanner does not know in advance which format a scanned label is in, the decoding unit typically rotates serially through the available decoding algorithms until the bar code format is recognized, if at all. If the label is not recognized, the read is determined to be unsuccessful. Less common bar code formats are usually given a lower priority for decoding purposes. If there are many available decoding algorithms, decoding speed may suffer if the correct bar code format is one of the later ones to be tried by the decoding unit. Consequently, the read rate varies depending on the priority of the correct bar code format. Because the available bar code formats remain in a fixed ranking, read rates will generally be slow for low priority, unusual, or long bar codes.

Speed in a bar code scanner is important because available processing time is short, especially in handheld scanners. Because the noise present in the optical and analog electronic signal paths can corrupt the data in a given scan, a number of scans of data are usually necessary before a good read decision can be made. Typical scan frames, or the time between data reads, in handheld scanners is about 25–35 milliseconds. The time between the end of one data set and the beginning of the next data set is perhaps 5–10 milliseconds. Because the same hardware is commonly used for both data collection and decoding, only this 5–10 millisecond period is typically available for decoding. If the decoder cannot finish all of the decode algorithms in this interval, one or more sets of subsequent scan data may be missed to allow decoding to finish. Long decoding times are particularly likely where there are many bar code formats being used or where one or more of the formats are of a long label type. For example, it may require as much as 40 milliseconds or more to decode a 40-character Code 128 label.

It may be possible to make use of faster hardware (e.g., higher-bit microprocessors) to attempt to speed up decode time. However, use of faster hardware may entail significantly greater cost, while the market for handheld scanners is very cost sensitive. Further, even faster hardware may not be able complete all decoding in a single scan frame. Faster hardware is also generally larger in size, requiring larger, bulkier handheld scanners and a corresponding sacrifice of ergonomics (e.g., size and shape of features). Since the power of digital processing hardware that can be built into a portable scanner has substantial size and cost limitations, software algorithms that can speed up the time to perform the decode operation are desirable to improve decoder performance.

SUMMARY OF THE INVENTION

The present invention relates to a method and apparatus for increasing the speed of scanners reading multiple bar code symbologies by changing the order of priority in which the various symbologies are tested by the decoding unit. In a preferred embodiment, after a particular symbology has been read a given number of times in a row, its priority is increased under the assumption that the likelihood of another label of the same symbology being read is increased. A particular symbology will continue to advance in priority the more often it is read until it becomes the highest priority symbology. This method may allow a bar code scanning device to test automatically for a large number of different bar code symbologies while maintaining high performance. Such a method decreases the chances that a label will be misread, as one cause of misread is when the wrong decoding algorithm is used in attempting to decode a particular label.

The foregoing and other objects, features, and advantages of the invention will become apparent from the following more detailed description set forth in conjunction with the accompanying drawings.

DETAILED DESCRIPTION OF THE PREFERRED EMBODIMENTS

Figure 1:
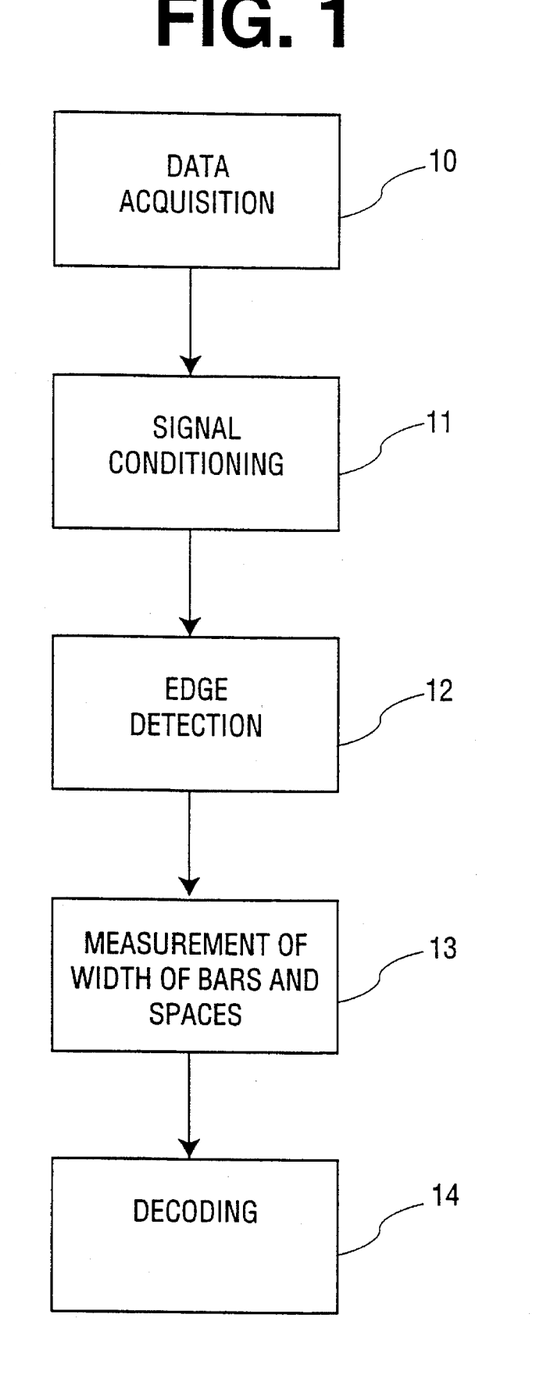
FIG. 1 is a block diagram identifying basic functional components of a typical scanner.

The preferred embodiments will now be described in reference to the drawings. FIG. 1 shows a block diagram identifying basic functional components of a typical scanner. The basic functions shown in FIG. 1 include a data acquisition block 10, a signal conditioning block 11, an edge detection block 12, a bar and space width measurement block 13, and a decoding block 14. The data acquisition block 10 typically comprises scanning means such as a flying spot laser source or a CCD array for detecting reflected and/or refracted light from a scanned bar code label. The data acquisition block 10 generates an electrical signal having an amplitude determined by the intensity of the collected light. Bar codes typically consist of a series of parallel light and dark rectangular areas (also known as "bars" and "spaces"). The arrangements of bars and spaces are selected in order to define different characters of a particular bar code. The electrical input signal generated by the data acquisition block 10 generally has one population of levels for dark bars and a second population of levels for light spaces. Positive-going and negative-going transitions in the electrical signal signify transitions between bars and spaces. The input signal is provided to a signal conditioning block 11 which conditions the input signal for further processing and may comprise a filter to reduce noise. An edge detection block 12 detects the location of the positive-going and negative-going transitions in the input signal. The edge location information is provided to a bar and space width measurement block 13 which determines the relative widths of the bars and spaces of the scanned label. The bar and space width information is provided to a decoding block 14 to determine whether the bars and spaces comprise a recognizable bar code and, if so, to decode the information contained in the bar code.

Figure 2:
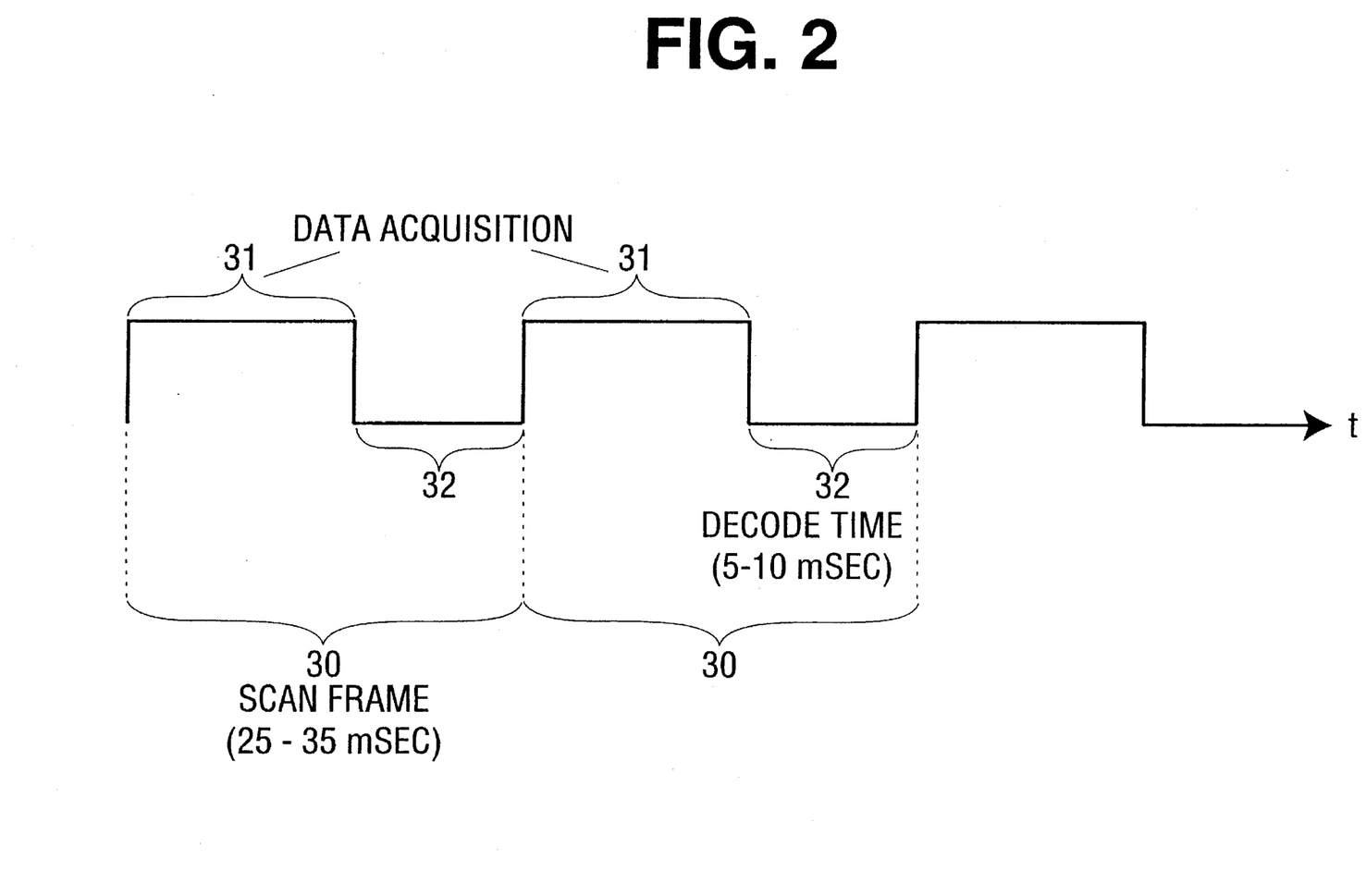
FIG. 2 is a timing diagram showing an available decoding time window.

Referring to FIG. 2, the available time for decoding is relatively short. A typical scan frame 30, or the time between data reads, in handheld or portable scanners is about 25–35 milliseconds. Data is collected in scans during a data acquisition period 31 which repeats periodically in order to increase the likelihood of obtaining a good read. Because the same hardware is commonly used for both data collection and decoding, the available decode time 32 is the time between the end of one data acquisition period 31 and the beginning of the next data acquisition period 31. Thus, the available decode time 32 for this example is about 5–10 milliseconds. If the decoding block 14 cannot finish all of the decode algorithms in the available decode time 32, one or more sets of subsequent scan data may be missed so that decoding may finish. This result is particularly likely to occur where there are many bar code formats being used or where one or more of the formats are of a long label type (e.g., a 40-character Code 128 label).

Figure 3:
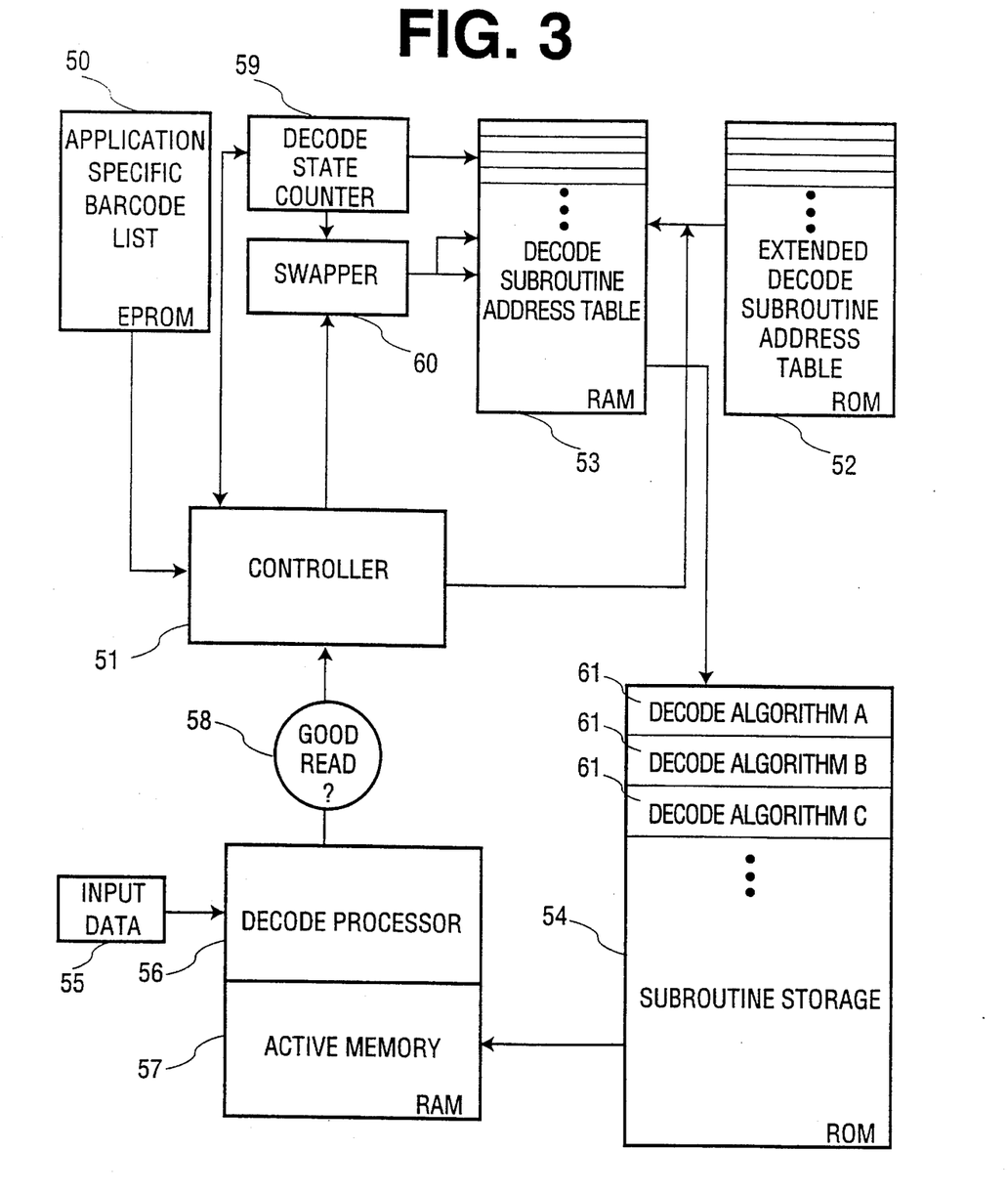
FIG. 3 is a block diagram of a decoder in accordance with one embodiment of the present invention.
Figure 4:
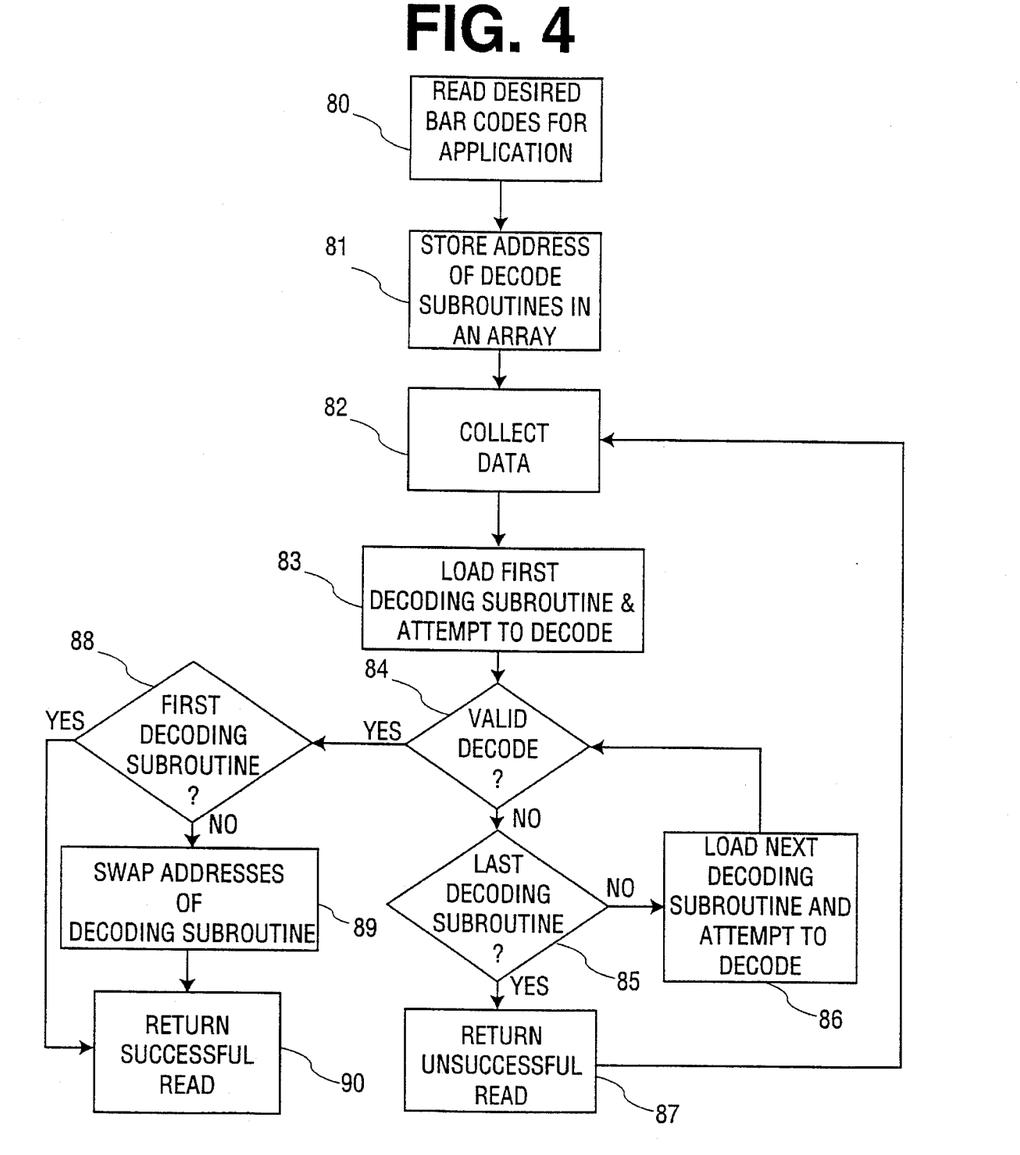
FIG. 4 is a flowchart showing the basic functional steps of a decoder in accordance with the embodiment shown in FIG. 3.

The preferred embodiment of the present invention may be described with reference to FIGS. 3 and 4. FIG. 3 is a block diagram showing a decoding system for performing automatic bar code discrimination, while FIG. 4 is a flowchart showing the basic functional steps of a decoder in accordance with the system shown in FIG. 3. The system in FIG. 3 includes an application specific bar code format list 50, a controller 51, a master decode subroutine address table 52, an active decode subroutine address table 53, a subroutine storage area 54, a processor 56, an active memory area 57, a decode state counter 59, a swapper 60, and a good read indicator 58. The operation of the system in FIG. 3 will be explained with reference to the steps of the flow chart in FIG. 4. The first two steps 80 and 81 of the flow chart essentially comprise an initialization process. The first step 80 in the flow chart is to read the desired bar code symbologies or formats for the particular application. The desired bar code formats may be selected manually by switches or through software such as by reading a programming label. Alternatively, the desired bar code formats may be located in nonvolatile memory such as a read-only memory ("ROM"), programmable ROM ("PROM") or an erasable programmable ROM ("EPROM"). The list of desired bar code formats 50 is provided to the controller 51 which, as indicated in the second step 81 of the flow chart, loads the addresses of the decoding subroutines into an array or table 53 located in active memory or, alternatively, in a cache memory. The addresses of the appropriate subroutines are located in a master decode subroutine address table 52 preferably comprising nonvolatile memory such as a ROM. Only the addresses of the bar code formats indicated by the application specific bar code list 50 are loaded from the master decode subroutine address table 52 to the active decode subroutine address table 53. In this manner, the bar code formats to be read can be readily changed depending on the desired application. System performance is enhanced by not including unnecessary bar code formats in the active portion of the decoder.

The decoding algorithms or subroutines 61 themselves are located in a subroutine storage area 54. The subroutine storage area 54 preferably comprises nonvolatile memory such as a ROM. The subroutine storage area 54 may be divided into identically sized segments for each subroutine for ease of access (for example, by simply adding a base to an offset) or may be divided into regions corresponding to actual subroutine size in order to conserve memory space. Each bar code format or symbology has a corresponding decoding algorithm or subroutine 61 located in the subroutine storage area 54. The master decode subroutine address table 52 thus stores the addresses of the decoding subroutines 61 located in the subroutine storage area 54. As mentioned above, the addresses being used in the particular application are provided from the master decode subroutine address table 52 to the active decode subroutine address table 53. Thus, the active address table 53 basically comprises an array of subroutine addresses. Because not all bar code formats may be tested at the same time, an order must be established for testing. Generally, in the preferred embodiment, the higher priority or more likely to be read bar code formats will appear at the "top" of the active address table 53, while the lower priority or less likely to be read bar code formats will appear at the "bottom" of the active address table 53. As the addresses will be moved within the active address table 53 during operation of the scanner, the active address table 53 is preferably comprised of volatile memory such as random-access memory ("RAM") or a cache memory.

Once the initialization process described above is completed, the system is ready to decode. Thus, the next step 82 of the flow chart is to collect input data 55. Once the input data 55 is acquired, as indicated in the following step 83 of the flow chart, the first subroutine 61 is loaded and the system attempts to decode. To explain in more detail, the controller checks the state in the decode state counter 59. The decode state counter 59 has one state for each entry in the active address table 53. Once input data 55 is read, the decode state counter 59 starts at zero (the "top" of the active address table 53) and cycles through the active address table 53 until the end of the active address table 53 is reached or the input data 55 is successfully decoded. Thus, the decode state counter 59 only moves to the next state upon an unsuccessful decode attempt for a given bar code format. Based on the state of the decode state counter 59, the appropriate subroutine 61 located in the subroutine storage area 54 is loaded into an active memory area 57. For example, if the address for the decoding subroutine for the UPC/EAN symbology is initially located at the top of the table, the decoding subroutine 61 for UPC/EAN would be loaded into the active memory 57. A processor 56 then applies the subroutine 61 present in the active memory 57 to the input data 55 in an attempt to decode the input data 55 in accordance with the particular bar code format.

The next step of the decoder depends upon whether or not decoding was successful under the particular bar code format, as determined in step 84 of the flow chart. If the decoding was unsuccessful, the controller 51 increments the decode state counter 59 and continues attempting to decode, as depicted in step 86 of the flow chart. The next address in the active address table 53 is read by the controller 51, which loads the corresponding subroutine 61 into active memory 57 in place of the previous subroutine 61. The processor 56 then attempts to decode the input data 55 in accordance with the new subroutine 61. If the decoding is unsuccessful, the controller 51 cycles serially through all of the decoding subroutines 61 which are referenced in the active address table 53, testing the input data against each symbology, until the end of the table 53 is reached or a successful read occurs. If the last decoding subroutine 61 is unsuccessful, then, as indicated in steps 85 and 87 of the flow chart, an unsuccessful read indication is returned, and the next set of scan data may be read and processed.

If, however, the processor 56 successfully decodes, then a good read signal 58 is provided to the controller 51. The controller then initiates a process of changing the priority of the addresses in the active address table 53 depending on their present relative priority. As indicated in step 88 of the flow chart, the controller 51 first checks the decode state counter 59 to see if the successful subroutine was the first one tried. If so, no change in priority is made. If, however, the successful subroutine 61 is not at the top of active address table 53, then the preferred method is to change the priority of the subroutines 61, as indicated in step 89 of the flow chart. The controller 51 employs a swapper 60 to perform the priority change. The swapper reads the current state in the decode state counter 59, and swaps the indicated subroutine address in the active address table 53 with the subroutine address immediately above it. Thus, no running counters or other internal bookkeeping is necessary in the preferred embodiment to reallocate priority. This process allows more time to be spent decoding rather than reshuffling the priority of the symbologies in the active address table 53. After a number of successful reads, the priority of the particular subroutine may gradually reach the top of the active address table 53.

Figure 5A:
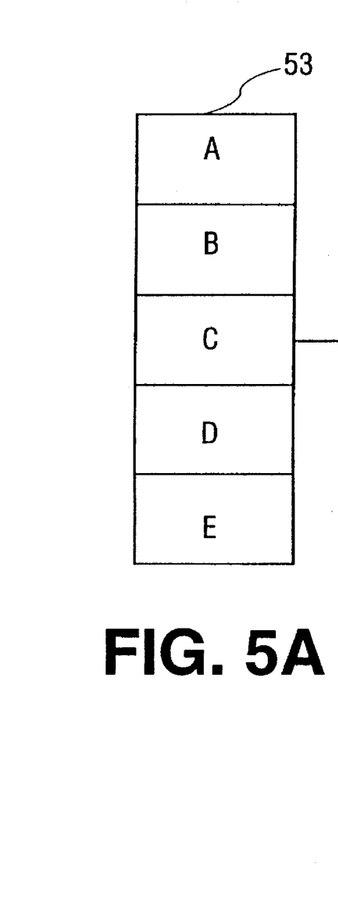
FIGS. 5A–5E are exemplary diagrams showing the contents of a decoding table over several consecutive reads.
Figure 5B:
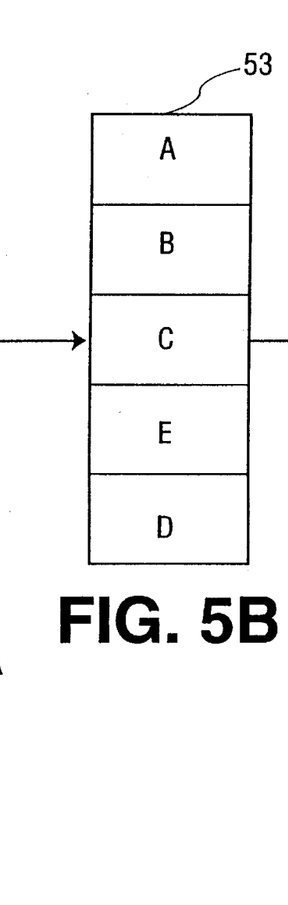
Figure 5C:
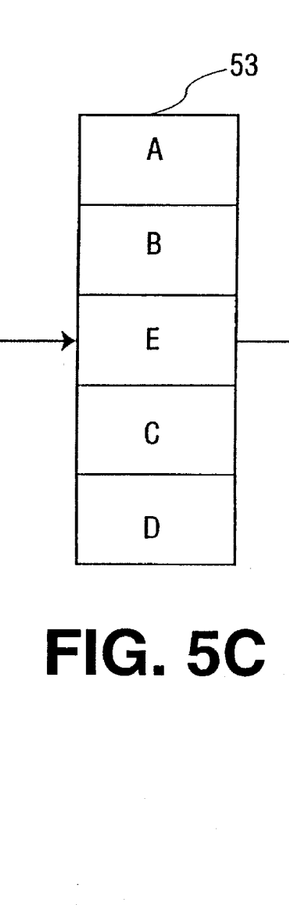
Figure 5D:
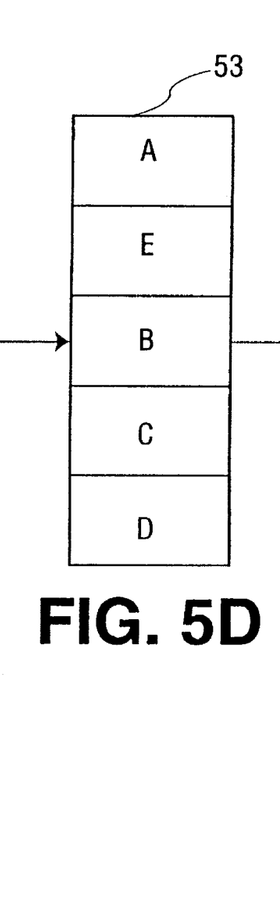
Figure 5E:
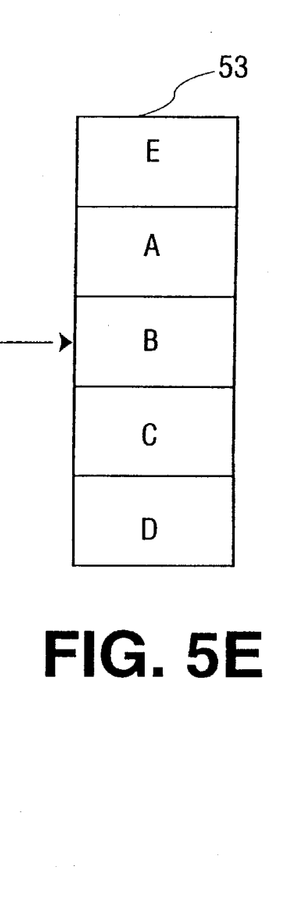

The effect of the swapper 60 is shown in more detail in FIGS. 5A–5E. FIG. 5A is an example showing an initial state of the, active decode table 53. The letters "A" through "E" each represent different bar code formats. Each of the bar code formats "A" through "E" have a corresponding subroutine address located in the specified position of the active address table 53. Although only five different bar code formats are used in the example of FIG. 5A, more formats may of course be used. FIG. 5B shows the state of the active decode table 53 after the swapper 60 has prioritized the table 53 based on a successful decoding using the bar code format "E". As shown by a comparison between FIGS. 5A and 5B, the bar code format "E" has been swapped with the immediately preceding bar code format "D". If another label of format "E" is read, as shown in FIG. 5C, the bar code format "E" will again be swapped with the preceding format, this time format "C". FIG. 5D and 5E show two more successive format "E" reads, which brings format "E" to the top of the table and gives it the highest priority. At that point, the system assumes that the likelihood of reading a type "E" label is greater than of any other label type. As no other label type has been read in the example, the relative priorities of the other format types "A" through "D" remain unchanged.

Alternative Embodiments

Figure 7:
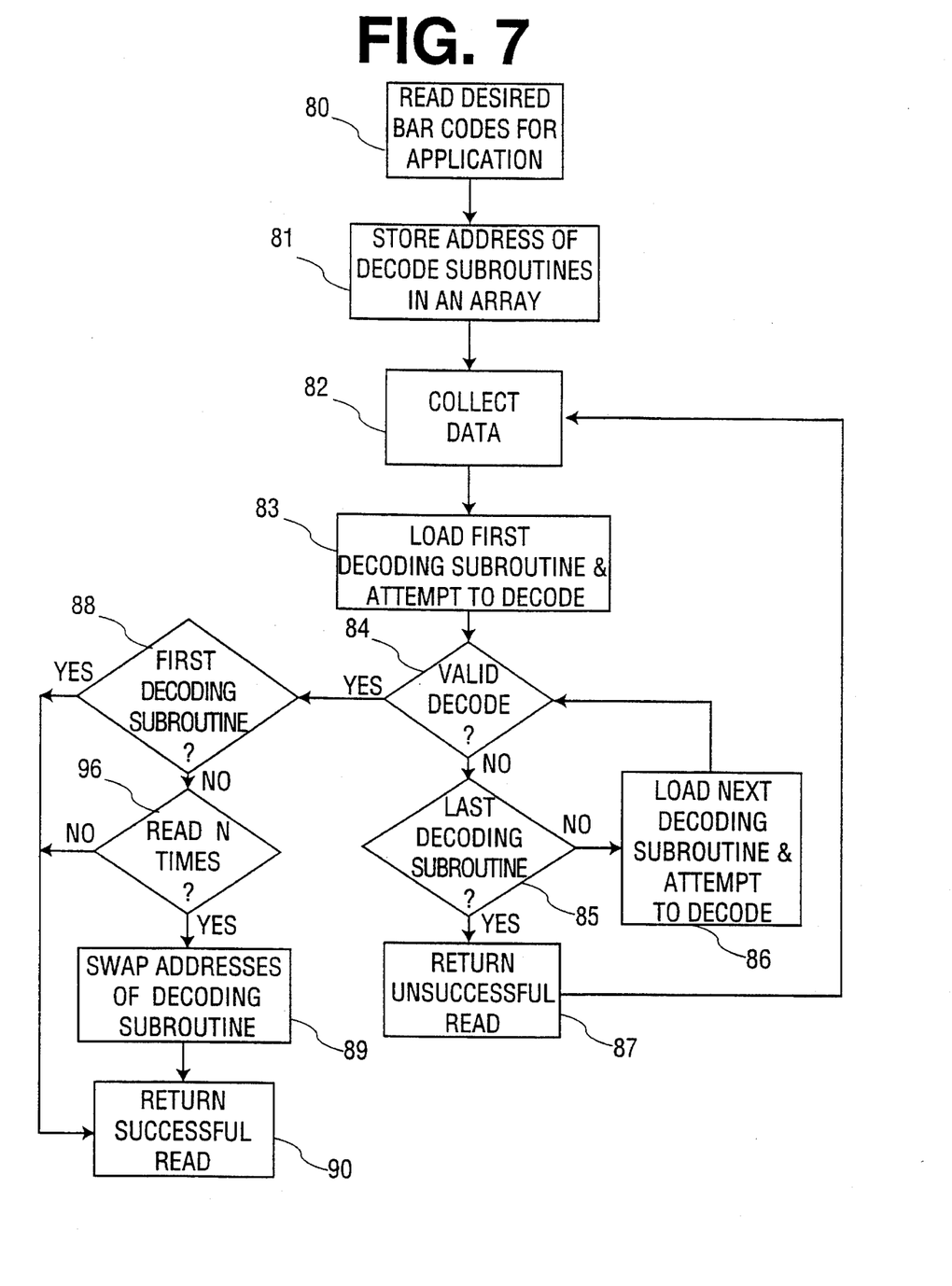
FIG. 7 is a flowchart showing the basic functional steps of a decoder in accordance with an alternative embodiment of a decoder.

Alternative embodiments may be directed to the manner of arranging the priority of the bar code formats within the active address table 53. FIG. 7 is a flowchart of one alternative embodiment of a decoder, wherein like elements of FIG. 4 and FIG. 7 are labeled in a like manner. In the FIG. 7 embodiment, no change of priority in the active address table 53 is made until a bar code format is read a predetermined number of times (e.g., three or four) as determined in step 96 of FIG. 7. In such a manner, the system priority scheme does not react as quickly to new formats being scanned, and short streams of unusual bar code labels will not significantly readjust the priority of the table.

Figure 8A:
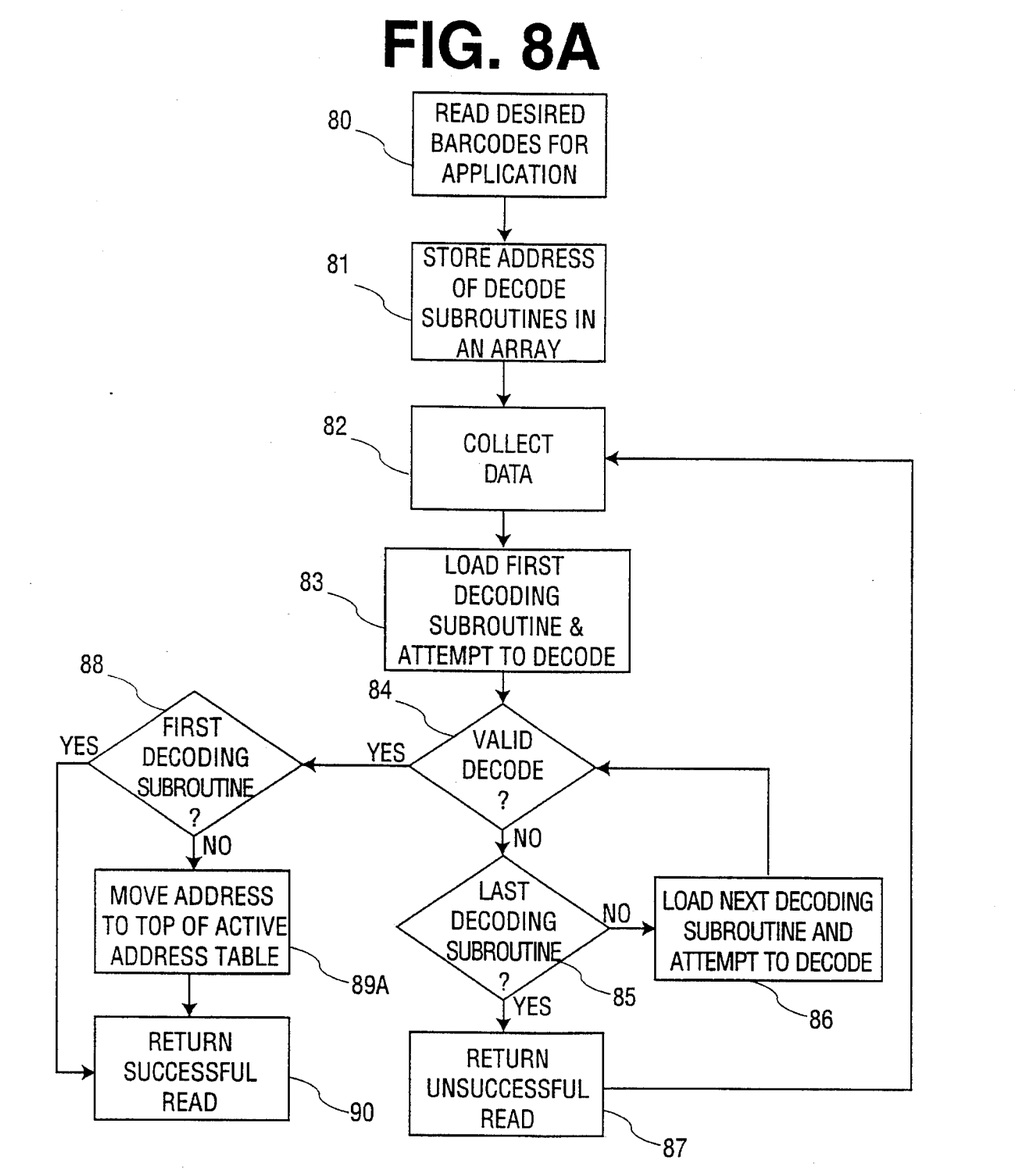
FIG. 8A is a flowchart showing the basic functional steps of a decoder in accordance with another alternative embodiment of a decoder.
Figure 8B:
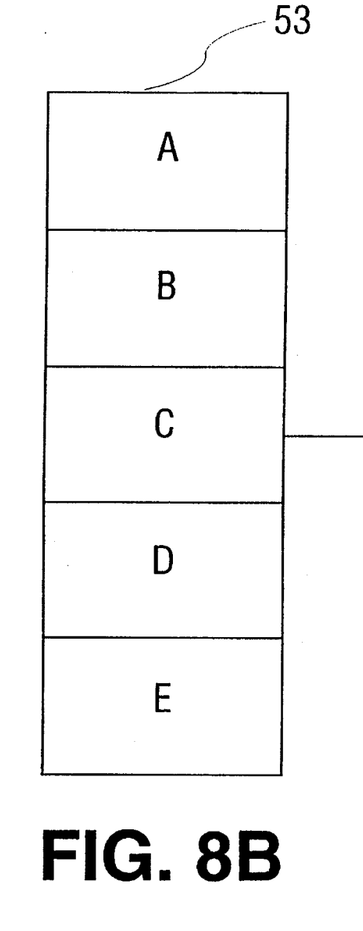
FIGS. 8B–8C are exemplary diagrams in accordance with the FIG. 8A embodiment showing the contents of a decoding table over several consecutive reads.
Figure 8C:
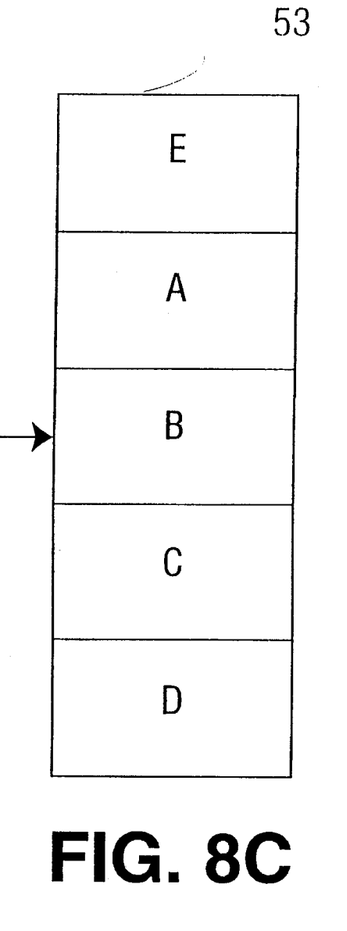

In another alternative embodiment, as set forth in FIGS. 8A–8C, the most recently read bar code format is not swapped with the next higher priority bar code format in the active address table 53. Rather, as shown in FIGS. 8B–8C and in step 89A of FIG. 8A, the most recently read bar code format "E" is moved immediately to the top of the active address table 53 and becomes the highest priority bar code format. This method is advantageous where spurts of consecutive bar code labels of the same format are expected.

Figure 6:
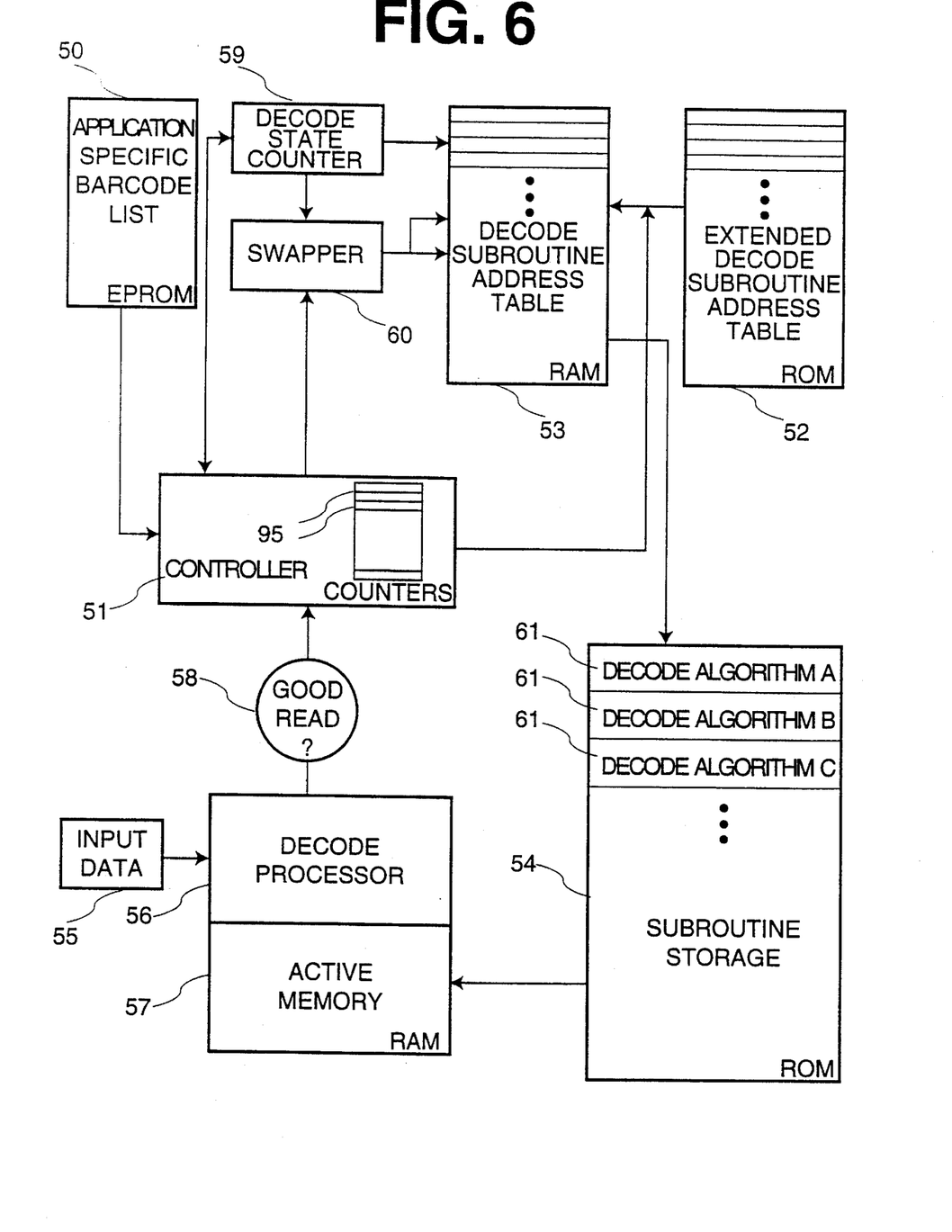
FIG. 6 is a block diagram of an alternative embodiment of a decoder in accordance with one or more aspects of the present invention.
Figure 9:
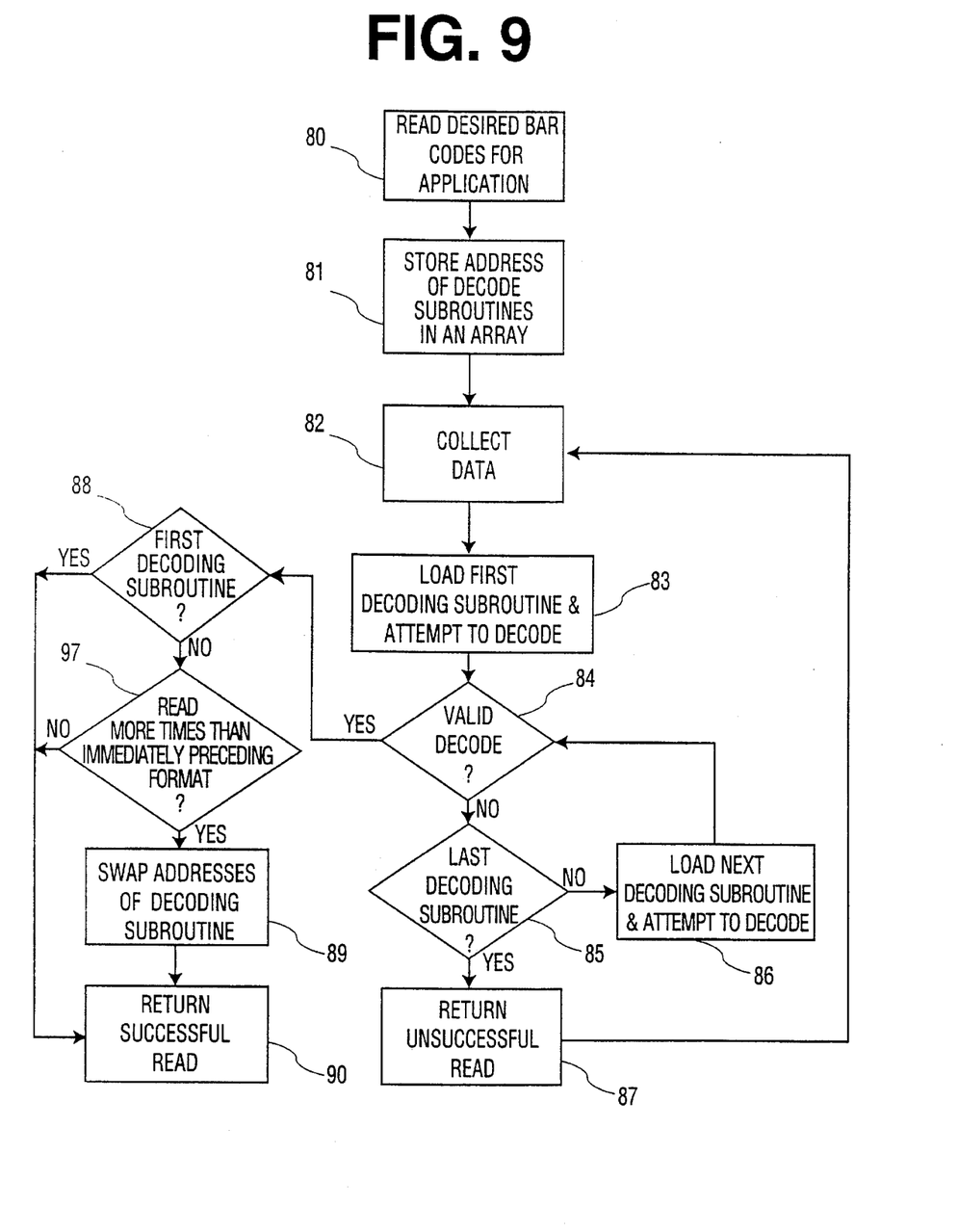
FIG. 9 is a flowchart showing the basic functional steps of a decoder in accordance with the FIG. 6 embodiment.

In yet another alternative embodiment, as shown in FIG. 6, internal counters 95 are used to keep track of the total number of reads for each label format being used. FIG. 6 is a block diagram of an alternative embodiment of a decoder, wherein like elements of FIG. 3 and FIG. 6 are labeled in a like manner. FIG. 9 is a flowchart showing the basic functional steps of a decoder in accordance with FIG. 6 embodiment. In the FIG. 6 embodiment, the bar code format with the most reads is assigned the highest priority, and the remaining formats are ranked in priority according to the relative number of reads for each. The bar code formate moves to the next higher priority when it has more relative reads than the immediately preceding bar code format, as determined in step 97 of FIG. 9 flowchart. One possible drawback of this method is that it is not as rapidly adapting to spurts of consecutive labels of the same format. For example, if one hundred UPC/EAN labels are read followed by one hundred Code 39 labels, the Code 39 symbology will move to second priority but will not become highest priority until at least one hundred Code 39 labels are read, which will slightly reduce system performance. This method also may require additional hardware or internal bookkeeping to implement.

In a variation of the above embodiment, the internal counters 95 keep track only of a predetermined number of the most recent reads. For example, the internal counters 95 may keep track of the most recent two hundred reads, and whereby the priority of the bar code formats is adjusted based only on those two hundred recent reads. To facilitate the operation of such a system, a first-in-first-out ("FIFO") buffer may be provided to store the most recent two hundred reads. As a bar code label is read, its format type is added to the FIFO buffer and the appropriate internal counter 95 is incremented. Before another label is read, the last element of the FIFO is discarded, and the internal counter 95 corresponding to the bar code format found in the discarded FIFO element is decremented. In such a manner, the totals for the bar code format in the FIFO need not be tabulated anew after each successful read; rather, accurate running totals are kept at all times.

In another alternative embodiment, fuzzy logic is utilized to select the priority of the bar code symbologies. Also, weighted values may be assigned to the various bar code symbologies and the priority could be reshuffled based on a combination of the weighted values and the recent history of symbologies read. It should be clear as well that numerous other reprioritizing schemes and variations are possible.

In addition to recognizing multiple bar code formats, the method and apparatus described herein may be equally applied to recognizing other characteristics and properties of scanned items. By way of example, the above techniques may be used to recognize a product type among a dozen or so alternative product types.

While the preferred embodiments have thus far been described with reference to bar code label scanners, other systems requiring high speed optical processing may also benefit from use of the method and apparatus described herein. For example, the method and apparatus described herein may be advantageously applied to optical character recognition systems in which a finite set of known images are to be read. Further, the method and apparatus may be implemented in the form of software, microcode, a finite state machine, a state controller, hardware, firmware, or any combination thereof in order to perform the functions previously described.

While a method and apparatus for reading multiple code formats has been particularly shown and described with reference to certain embodiments, it will be understood by those skilled in the art that various changes in form and detail may be made without departing from the spirit and scope of the invention.

---

APPENDIX

Attached hereto as an Appendix are the following pages of computer code written in Motorola 68HC16 Assembly language implementing algorithms for decoding in accordance with the preferred embodiment of the present invention:

---

Copyright © Spectra-Physics Scanning Systems, Inc. 1993

```
START_DECODE:
    LDAB    #EXT_RAM_BANK
```

-continued

```
      TBEK
; subtract two so we are pointing at the last data element
      AIZ     #-2
; first check if enough data was collected to bother decoding, if not then
; go back to our idle loop
      CPZ     #MIN_TRANSITIONS
      LBCS    KEEP_SCANNING
      STZ     DATA_END                ; save our last data location
      LDD     #DATA_BUFFER            ; save the starting buffer location
      STD     DATA_START
; if we are in programming mode, don't call the regular decoders
      LDAA    _In_Prog_Mode
      BNE     TRY_PROG_LBL
; set the flag to indicate that we are decoding
      LDAA    #0FFH
      STAA    DECODING
      ANDP    #0FEFFH                 ; clear the CARRY bit
      CLRB                            ; Reg. B contains the decoder table offset
; if we have enough data to decode, pull the decoder addresses in order
; from DECODER_TABLE
DECODE_LOOP:
      PSHM    D,K                     ; save Reg. B
      LDX     #DECODER_TABLE
      ROLB
      ABX                             ; calculate next decoder address in table
      LDY     0,X                     ; load decoder address and jump to it
      JSR     0,Y
      PULM    D,K                     ; restore table offset
      BCS     GOT_GOOD_READ           ; jump if a good read
      INCB                            ; otherwise, increment offset and loop
      BRA     DECODE_LOOP
; if we decode a label, branch to this point
GOT_GOOD_READ:
; this routine sorts the decoder stack to move the most frequently read
; symbologies towards the top of the stack
; the location in the stack of the label type that was just read is in Reg. B
; if this decoder is already at the top of the stack then do nothing
      CMPB    #0
      BEQ     SKIP_SORT
; otherwise swap this decoder with the one above it in the stack
      LDX     #DECODER_TABLE
      ROLB
      ABX
      LDD     -2,X
      LDY     0,X
      STY     -2,X
      STD     0,X
SKIP_SORT:
→

;**********************************************************************
;
; the decoder addresses live in a table so that they can be dynamically
; sorted according to who is used the most
; this also allows only the decoders which are enabled to even be called
_INIT_DECODERS:
INIT_DECODERS:
      PSHM    D,E,K,X
      LDAB    #EXT_RAM_BANK
      TBEK
      LDAB    #INT_RAM_BANK
      TBXK
      LDX     #DECODER_TABLE
      LDD     _Symbologies
; test the bit in the Symbologies flag for each decoder, load only the
; decoder addresses of the enabled symbologies
CHECK_UPC:
      BITB    #01H
      BEQ     CHECK_C39
      LDE     #UPC_EAN_DECODER        ; UPC/EAN decoder address
      STE     0,X
      AIX     #2                      ; increment table pointer
CHECK_C39:
      BITB    #02H
      BEQ     CHECK_C128
      LDE     #CODE_39_DECODER        ; Code 39 decoder address
      STE     0,X
      AIX     #2                      ; increment table pointer
CHECK_C128:
      BITB    #40H
```

```
        BEQ    CHECK_IT25
        LDE    #CODE_128_DECODER      ; Code 128 decoder address
        STE    0,X
        AIX    #2                     ; increment table pointer
CHECK_IT25:
        BITB   #08H
        BEQ    CHECK_CBAR
        LDE    #IT2OFS_DECODER        ; Interleaved 2/5 decoder address
        STE    0,X
        AIX    #2                     ; increment table pointer
CHECK_CBAR:
        BITB   #04H
        BEQ    CHECK_C93
        LDE    #CODABAR_DECODER       ; Codabar decoder address
        STE    0,X
        AIX    #2                     ; increment table pointer
CHECK_C93:
        BITB   #20H
        BEQ    CHECK_ID25
        LDE    #CODE_93_DECODER       ; Code 93 decoder address
        STE    0,X
        AIX    #2                     ; increment table pointer
CHECK_ID25:
        BITB   #10H
        BEQ    CHECK_MSI
        LDE    #ID2OF5_DECODER        ; Industrial 2/5 decoder address
        STE    0,X
        AIX    #2                     ; increment table pointer
CHECK_MSI:
        BITB   #80H
        BEQ    CHECK_UPCD
        LDE    #MSI_DECODER           ; MSI/Plessey decoder address
        STE    0,X
        AIX    #2                     ; increment table pointer
CHECK_UPCD:
        LDAB   _UpcOptions            ; the bit for the UPC D decoder is in
        BITB   #08H                   ; UpcOptions flag
        BEQ    SET_END_ADDRESS
        LDE    #UPC_D_DECODER         ; UPC D decoder address
        STE    0,X
        AIX    #2                     ; increment table pointer
SET_END_ADDRESS:
        LDE    #DECODE_PROG_LBL       ; address to jump out of decoder loop
        STE    0,X
        PULM   D,E,K,X
        RTS
```

What is claimed is:

1. An apparatus for reading encoded symbols comprising:

a scanner for reading an encoded symbol, a table of symbologies ranked in an order of priority, a decoder for identifying a symbology of the encoded symbol from among the symbologies in said table, and a swapper for prioritizing the symbologies in said table based on a symbology of the encoded symbol which has just been read.

2. An apparatus as in claim 1 wherein said swapper prioritizes the symbologies in said table by swapping the symbology of the encoded symbol most recently read with a symbology of immediately higher priority in said table.

3. An apparatus as in claim 1 wherein said swapper prioritizes the symbologies in said table by moving a position of the symbology of the encoded symbol most recently read to the highest priority position in said table.

4. An apparatus as in claim 1 further comprising a counter for each symbology to count how often each symbology is read, wherein the counter corresponding to the symbology of the encoded symbol which has just been read is incremented in response to said reading, and wherein said swapper thereafter prioritizes the symbologies in said table based on values in said counters.

5. An apparatus as in claim 1 wherein a number of times each symbology is read is recorded and updated upon said reading, and said swapper prioritizes the symbologies in said table only after a given symbology is read a predetermined number of times.

6. An apparatus as in claim 1 wherein said table of symbologies comprises an array of addresses of subroutines for decoding according to the particular symbology.

7. An apparatus as in claim 1 wherein the symbologies in said table are selected from among a group of available symbologies.

8. A method for recognizing multiple symbologies comprising the steps of:

arranging a plurality of symbologies in an order of priority, reading a symbol, identifying a symbology of said symbol from among the plurality of symbologies by testing said symbol against each of the plurality of symbologies in accordance with said order of priority until the symbology of said symbol is identified, and adjusting the order of priority of said symbologies.

9. A method as in claim 8 wherein said step of adjusting the priority of said symbologies comprises swapping the symbology of the read symbol with the symbology of immediately higher priority.

10. A method as in claim 8 wherein said step of adjusting the priority of said symbologies comprises changing the priority of the symbology of the symbol most recently read to the highest priority.

11. A method as in claim 8 wherein said step of adjusting the priority of said symbologies further comprises the step of counting how often each symbology is read, wherein the adjustment of priority is based in part on the relative number of times each symbology is read.

12. A method as in claim 8 wherein said step of adjusting the priority of said symbologies is done when a symbology is read a predetermined number of times.

13. A method as in claim 8 wherein said step of identifying a symbology of said symbol further comprises the step of executing, in said order of priority, a decoding subroutine for each symbology until the symbology of said symbol is identified.

14. A method as in claim 8 wherein said step of arranging a plurality of symbologies further comprises selecting said symbologies from among a group of available symbologies.

15. A method as in claim 14 wherein said group of available symbologies is stored in nonvolatile memory.

16. A method as in claim 8 wherein said symbol is a bar code label.

17. An apparatus for reading bar code labels comprising:

a scanner for reading a bar code label, a table of symbologies ranked in an order of priority, a decoder for identifying a symbology of the bar code label from among the symbologies in said table by cycling through said symbologies in accordance with said order of priority and testing the bar code label against each symbology until the symbology of the bar code label is identified, and a swapper for changing the priority of said symbologies in said table based on the symbology of the bar code label.

18. An apparatus as in claim 17 wherein the priority of the symbology of the bar code label increases to an immediately higher priority upon a successful read.

19. An apparatus as in claim 1 wherein said decoder executes, in said order of priority, a decoding subroutine for each symbology in said table until the symbology of said symbol is identified.

20. A method as in claim 8 wherein the order of priority of said symbologies is adjusted based on the symbology of the read symbol.

21. An apparatus for reading encoded symbols comprising:

means for acquiring data representing an encoded symbol, a table of symbologies arranged in an order of priority, a decoder responsive to said data acquiring means, wherein said decoder identifies a symbology of the encoded symbol from among the symbologies in said table, and a priority adjuster responsive to said decoder, whereby said priority adjuster rearranges the order of priority of the symbologies in said table.

22. An apparatus as in claim 21 wherein said priority adjuster rearranges the order of priority of the symbologies by swapping the symbology of the encoded symbol most recently identified with the symbology of immediately higher priority in said table.

23. An apparatus as in claim 21 wherein said priority adjuster rearranges the order of priority of the symbologies by moving a position of the symbology of the encoded symbol most recently identified to a highest priority position in said table.

24. An apparatus as in claim 21 further comprising a plurality of counters for counting how often each symbology is identified, wherein said priority adjuster rearranges the order of priority of the symbologies in said table based on values in said counters.

25. An apparatus as in claim 21 wherein said priority adjuster rearranges the order of priority of the symbologies in said table only after a given symbology is identified a predetermined number of times.

26. An apparatus for reading encoded symbols comprising:

data acquisition means for detecting an encoded symbol, a table of symbologies arranged in an order of priority, means for identifying a symbology of the encoded symbol from among the symbologies in said table, and means for rearranging the order of priority of the symbologies in said table.

27. A method for identifying multiple symbologies comprising the steps of:

arranging in an order a plurality of symbol identifiers, each of said symbol identifiers associated with a set of decoding instructions, reading data corresponding to a symbol, attempting to decode said data in accordance with the order of said symbol identifiers, and upon a successful attempt to decode, adjusting said order of said symbol identifiers.

28. A method as in claim 27 wherein the step of reading data comprises periodically scanning during a data acquisition period.

29. A method as in claim 27 wherein said symbol comprises a bar code label, and said symbol identifiers correspond to bar code formats.

30. A system for performing automatic bar code discrimination comprising:

means for acquiring data associated with a bar code, a decoder which applies in a specified order a series of decoding subroutines to said data, a priority adjuster responsive to said decoder, whereby the order in which said decoder thereafter applies said series of decoding subroutines is adjusted when a format of said data is recognized.

* * * * *